United States Patent

Patent No.: 4648

The United States of America

TO ALL TO WHOM THESE Letters Patent SHALL COME:

Whereas [illegible]

the United States hath alleged that he has invented a new and useful improvement

[illegible]

which improvement he states has not been known or used before his application; hath [illegible]
that he does verily believe that he is the true inventor or discoverer of the said improvement; hath
paid into the treasury of the United States the sum of thirty dollars, delivered a receipt for
the same, and presented a petition to the Secretary of State, signifying a desire of obtaining an
exclusive property in the said improvement, and praying that a patent may be granted for that
purpose. These are therefore to grant, according to law, to the said [illegible]
his heirs, administrators, or assigns, for the term of fourteen years from the [illegible] day of
[illegible] one thousand eight hundred and [illegible] the full and exclusive right and
liberty of making, constructing, using and vending to others to be used, the said improvement,
a description whereof is given in the words of the said [illegible] himself
in the schedule hereto annexed, and is made a part of these presents.

In Testimony whereof, I have caused these Letters to be made Patent, and the
Seal of the United States to be hereunto affixed.

GIVEN under my hand at the City of Washington, this [illegible] day
of [illegible] in the year of our Lord one thousand eight hundred
and [illegible], and of the independence of the United States of America
the [illegible]

J. Q. Adams

BY THE PRESIDENT.

[illegible] Secretary of State.

City of Washington, TO WIT:

I DO HEREBY CERTIFY, That the foregoing Letters Patent were de-
livered to me on the [illegible] day of [illegible] in the year of our
Lord one thousand eight hundred and [illegible] to be examined;
that I have examined the same, and find them conformable to law; and
I do hereby return the same to the Secretary of State within fifteen days
from the date aforesaid, to wit: on this [illegible] day of [illegible]
in the year aforesaid.

[illegible] Attorney General of the United States.